United States Patent [19]
Rasmussen

[11] Patent Number: 5,531,241
[45] Date of Patent: Jul. 2, 1996

[54] CONDENSATE TRAP AND DRAIN FOR SYSTEMS UNDER PRESSURE

[76] Inventor: John Rasmussen, 8433 South Ave., Youngstown, Ohio 44514

[21] Appl. No.: 445,223

[22] Filed: May 18, 1995

Related U.S. Application Data

[63] Continuation-in-part of Ser. No. 247,879, May 23, 1994, Pat. No. 5,469,879.
[51] Int. Cl.[6] ....................................................... G05D 9/12
[52] U.S. Cl. ........................... 137/188; 137/396; 137/403
[58] Field of Search .................................... 137/188, 386, 137/396, 403, 407, 558

[56] References Cited

U.S. PATENT DOCUMENTS

| | | |
|---|---|---|
| 1,681,344 | 8/1928 | Bell-Irving et al. |
| 2,705,545 | 4/1955 | Gothberg ............................ 137/396 X |
| 3,421,538 | 1/1969 | Hembree .................................. 137/396 |
| 3,429,329 | 2/1969 | Berkley. |
| 3,526,276 | 9/1970 | Bennett et al. ...................... 137/188 X |
| 3,675,673 | 7/1972 | Nilges ..................................... 137/187 |
| 3,946,753 | 3/1976 | Tischler .................................. 137/386 |
| 4,261,382 | 4/1981 | Bridges ................................... 137/187 |
| 4,308,889 | 1/1982 | Lin et al. ................................. 137/187 |
| 4,336,821 | 6/1982 | Frantz et al. ........................... 137/187 |
| 4,974,626 | 12/1990 | Koch ..................................... 137/187 |

*Primary Examiner*—Stephen M. Hepperle
*Attorney, Agent, or Firm*—Harpman & Harpman

[57] ABSTRACT

A condensate removal device for capturing, measuring and removing condensate from a fluid system having air or gas under pressure. The device purges only condensate on demand without loss of relative pressure inherent within the system. A differential pressure sensor senses the low and high level of condensate in a condensate collection reservoir activating a diaphragm type discharge valve venting condensate from the reservoir. Once condensate levels fall below a pre-determined level within the reservoir the valve is closed awaiting accumulation of additional condensate before cycling again.

4 Claims, 3 Drawing Sheets

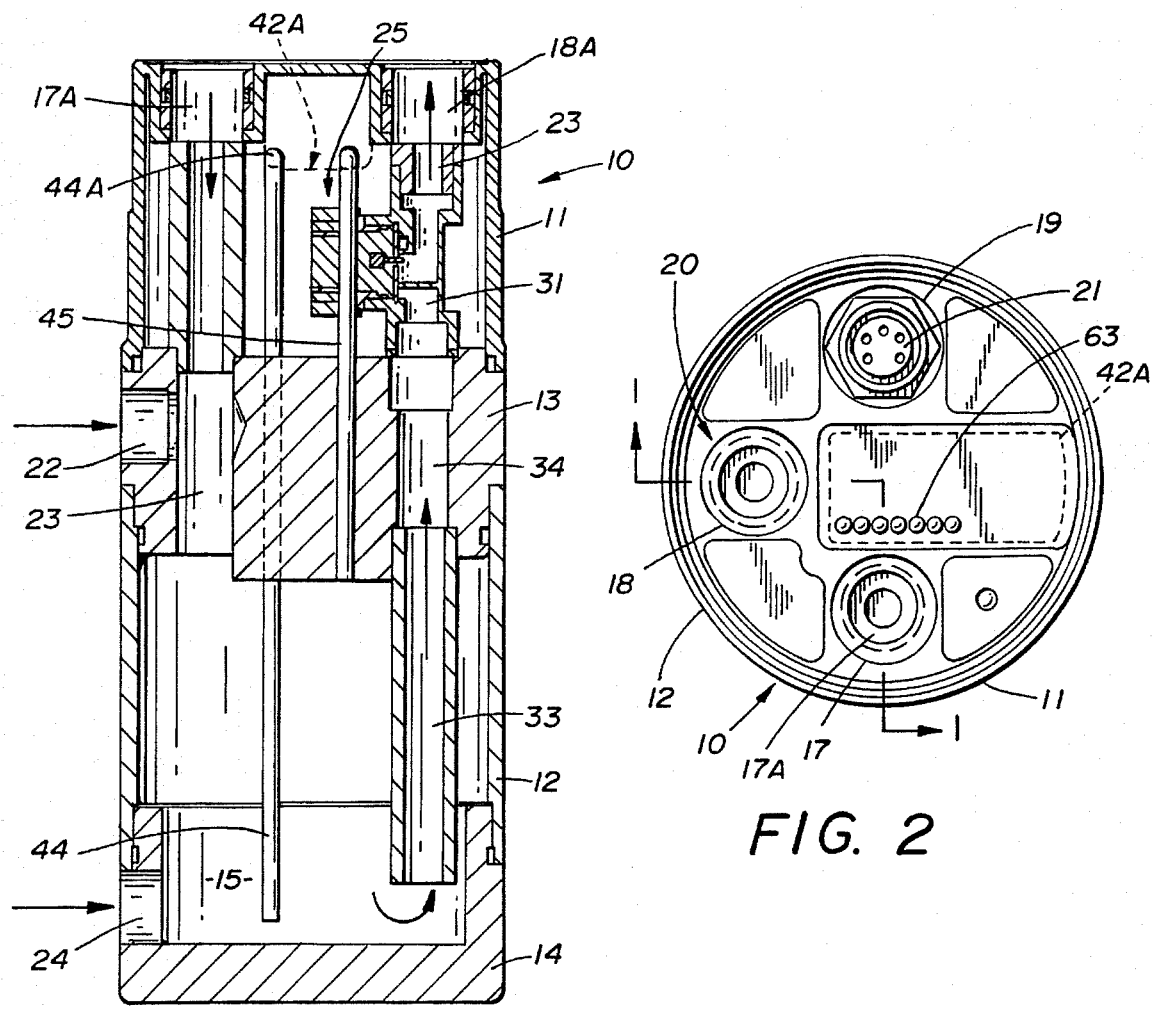
FIG. 1
FIG. 2
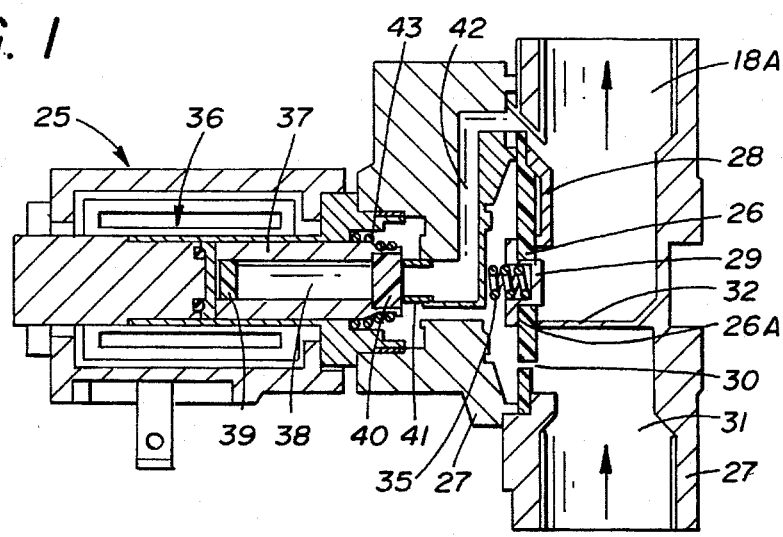
FIG. 3

CONDENSATE TRAP AND DRAIN FOR SYSTEMS UNDER PRESSURE

This is a Continuation in Part patent application of Ser. No. 08/247,879, filed May 23, 1994, now U.S. Pat. No. 5,469,879.

BACKGROUND OF THE INVENTION

1. Technical Field

This device relates to automatic discharge valves used in condensate traps associated with fluid pressurized systems. It is required to drain accumulated condensate from the traps so that the system will remain free of intrained moisture that persist during compression and expansion of gases under pressure.

2. Description of Prior Art

Prior art devices of this type have been known as float controlled condensate traps which increases the possibility of valve sticking which allows loss of gas or air under pressure within the system. Prior art devices have also utilized timer activated purge valves which can become independent from actual condensate levels within the traps again allowing for an unwanted loss of pressure. Sensing systems have been developed that rely on two condensate sensors with a trap to indicate low and high condensate levels within. Single sensor probes have also been illustrated that contain two sensing elements in a single probe body allowing for reliable selective activation and auditing of the purge valve by separate sensing elements within, see for example U.S. Pat. Nos. 1,681,344, 3,429,329 3,675,673, 4,261,382, 4,308,889, 4,336,821 and 4,914,626.

In U.S. Pat. No. 1,681,344 a condensate removing system is shown wherein an auxiliary condensate discharge pipe and discharge valve utilizes a differential of pressure between supply header and discharge header requiring an unbalance of air pressure for condensate to be purged from the system.

U.S. Pat. No. 3,429,329 is directed to a drain apparatus for automatically draining condensate which determines when condensate collects in the drain pipe the differential head pressure between the drain pipe and the chamber exert pressure on an air trap. The weight of the diaphragm is thus overcome and the air pilot valve closes to shut off flow of compressed air to the discharged valve. The pressure in the discharge valve is reduced and the fluid is discharged through the drain pipe.

U.S. Pat. No. 3,675,673 is directed to a pressure activated drain valve responsive to differential and fluid viscosity i.e. air and water.

In U.S. Pat. No. 4,261,382 a condensate drain valve is disclosed wherein single and multiple sensors are positioned within fluid transfer system to activate an electronic circuit for drain valve operation. Once a probe is covered with condensate, a positive output is achieved to an integrated circuit that compares same with an inherent value within the circuit opening the main valve within a timing event circuit.

U.S. Pat. No. 4,308,889 is directed to an electric conductive type steam trap having a condensate level detecting apparatus connected to a control circuit that activates a solenoid valve discharging the condensate. The valve activation is timed for closing after a pre-determined time element has expired after the condensate detecting probe is free of condensate. The probe is a simple on/off signal activation device.

U.S. Pat. No. 4,336,821 discloses a solenoid activated drain valve in which the valve element is a differential piston exposed on opposite faces to reservoir pressure normally holding the valve closed and minimizing the opening force required to be exerted by the solenoid. A temperature responsive heating element protects the valve from freezing while a sensing element determines the presence of water allowing the valve to operate.

Finally, in U.S. Pat. No. 4,974,626 a condensate trap valve is shown utilizing two sensors positioned in vertically spaced relation to one another in a single tube within a condensate accumulation chamber. As the first sensor is submerged in condensate a signal is formed indicating low level and it is the differential in contact between the two sensors which determine an activation of the condensate trap valve within the system.

OBJECTS AND ADVANTAGES

Accordingly it is an object of the present invention to provide a condensate trap and purging system under pressure which senses the appropriate level of condensate within the condensate chamber by the use of differential pressure within as sensed by a differential pressure sensor which is connected to two input pressure ports within the condensate chamber.

Another objective of the present invention is to provide a modular construction of the condensate trap so that the reservoir can be easily cleaned and the sensing, electrical and mechanical components can be easily maintained, repaired or replaced.

Other objects and features of the present invention will be obvious to those skilled in the art. It should be noted, however, that the drawings are designed for the purpose of illustration only and not as a definition of the limits of the instant invention, for which reference should be made to the claims appended to the hereto.

SUMMARY OF THE INVENTION

A condensate removal device that selectively and progressively senses the presence and relative amount of condensate accumulating within a condensate reservoir. A differential pressure sensing element that compares pressure above the condensate to pressure below the condensate responds to gradual increases in accumulated condensate and activates a control circuit that determines preset condition levels and opens a purge valve eliminating condensate from the system. Decrease pressure above the condensate defines a purge cycle completion and thus deactivates the purge valve. Secondary purge and valve activation is achieved at low condensate level if high level is not achieved after a set time to assure the purging of sediment build-up without pressure loss within the system.

DESCRIPTION OF THE DRAWINGS

FIG. 1 is a cross-sectional view on lines 1—1 of FIG. 2;

FIG. 2 is a top plan view of the condensate drain valve construction;

FIG. 3 is an enlarged cross-section of a condensate purge valve within the system;

DESCRIPTION OF THE PREFERRED EMBODIMENT

Figure 4:
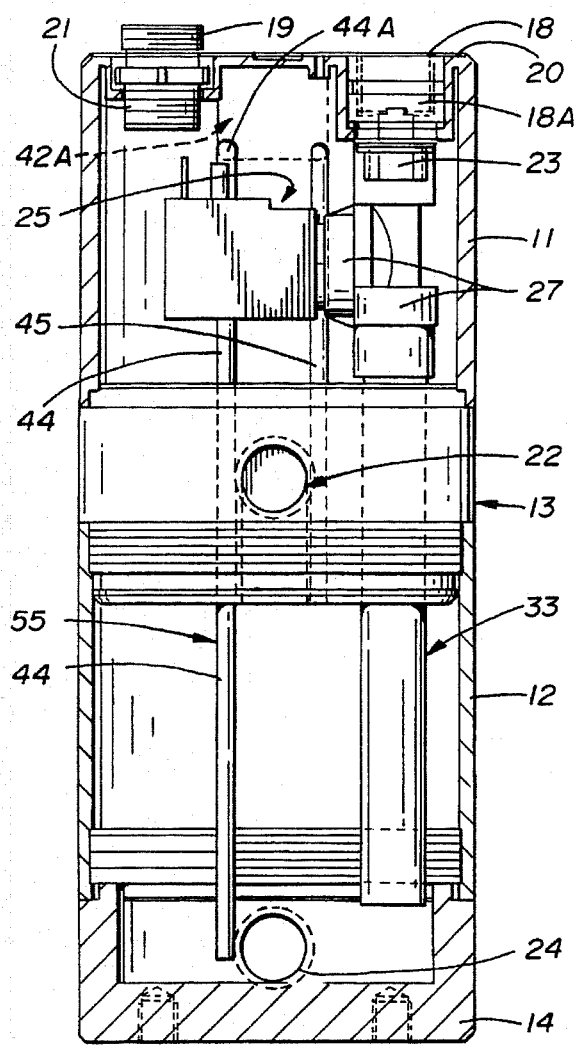
FIG. 4 is a cross-sectional view of the condensate drain valve construction.

Referring to FIGS. 1–4 of the drawings, a condensate trap and drain valve 10 can be seen having an upper main cylinder housing 11 and a lower main cylinder housing 12. A threaded top cap 13 is positioned between said respective housings with a bottom cap 14 threadably secured to the lower main cylinder housing 12 defining a condensate reservoir 15 within. The upper main cylinder housing 11 has multiple apertures at 17, 18, and 19 formed within a recessed end portion 20. Said apertures 17 and 18 are connector fittings defining a condensate inlet port 17A and a purge outlet port 18A respectively. A multiple pin electronic connector fitting 21 is threadably secured within said remaining aperture at 19. A secondary condensate inlet port 22 is positioned in the top cap 13 and is interconnected with said inlet port 17A via an internal passageway 23 best seen in FIG. 1 of the drawings. A third condensate inlet port 24 is provided within the bottom cap 14 in direct communication with the condensate reservoir 15 and said hereinbefore described inlet ports 17A and 22.

The purge outlet port 18A is in communication with a solenoid valve assembly 25, best seen in FIGS. 1 and 3 of the drawings. The solenoid valve assembly 25 is comprised of a flexible diaphragm 26 which is secured around its perimeter between a valve housing 27 and a purge port housing 28. The diaphragm 26 has a centrally located spring seat fitting 29 and is apertured at 30 adjacent said seat fitting which defines a communication passageway with a lower purge outlet housing passageway 31 defined by a partition 32 within. The lower purge outlet housing passageway 31 extends downwardly from the partition 32 to a discharge pipe 33 via an interconnecting bore 34 within the top cap 13 between the hereinbefore described main cylinder housings 11 and 12. The discharge pipe 33 extends from the top cap 13 into the condensate reservoir 15, best seen in FIG. 4 of the drawings.

A coil spring 35 extends from the spring seat fitting 29 and abuts against the inner portion of the valve housing 28 which defines a fluid passageway on one side of the diaphragm 26. The spring 35 urges the diaphragm 26 against a valve seat 26A formed by a valve port within the housing 27 just above the partition 32 as will be well understood by those skilled in the art.

It will thus be evident from the above description that to lift the spring seat fitting 29 on the associated diaphragm 26, the force of the spring 35 must be overcome. In operation, atmospheric pressure is present within the purge outlet port 18A above the partition 32 whereas in the condensate chamber 15 and the lower purge outlet housing passageway 31 above atmospheric pressure is maintained by the system during operation.

Referring back to FIG. 3 of the drawings, a solenoid 36 can be seen having a coil 37 and a plunger 38 which is mounted in the valve housing 27. The plunger 38 has a top valve gasket 39 and a bottom valve gasket 40 which engages against a valve seat 41 in a pilot orifice passageway 42 that is in communication with the purge outlet port 18A. A spring 43 is engaged about the plunger 38 urging the bottom valve gasket 40 against the hereinbefore disclosed valve seat 41.

Referring to FIGS. 1 and 4 of the drawings, an electronic differential pressure sensor unit 42A shown in broken lines is positioned within the upper portion of the housing 11 adjacent the solenoid valve assembly 25 hereinbefore described. A pressure sensor tube 44 projects vertically downwardly from a differential pressure sensor port 44A on the differential pressure sensor 42A into the condensate reservoir 15 adjacent the bottom cap 14. A second pressure sensing tube 45 projects vertically downwardly from a differential pressure sensor port 45A to a point adjacent the top of the condensate chamber 15.

The differential pressure sensor 42A is of a solid state component design having a piezoresistive differential pressure sensor (PDPS) 42B that converts variation in pressure inputs to a linear variation in a resistor network. An amplification section 42C for amplification of the voltage variation generated by the variation in resistance from the (PDPS) and multiple pressure trip point adjustments 42D that compares voltage levels of the amplifier to a user adjustable voltage level by a trip point adjustment 62 and generates an output where the levels cross.

In this application as the condensate C (water) level rises and falls within the condensate reservoir 15 the pressure differential changes between the top and bottom of the reservoir 15 as sensed by the differential pressure sensor 42A interconnected to the respective sensor tubes 44 and 45. The corresponding signal from the differential pressure sensor 42A is then processed by a control circuit as hereinafter described.

Figure 5:
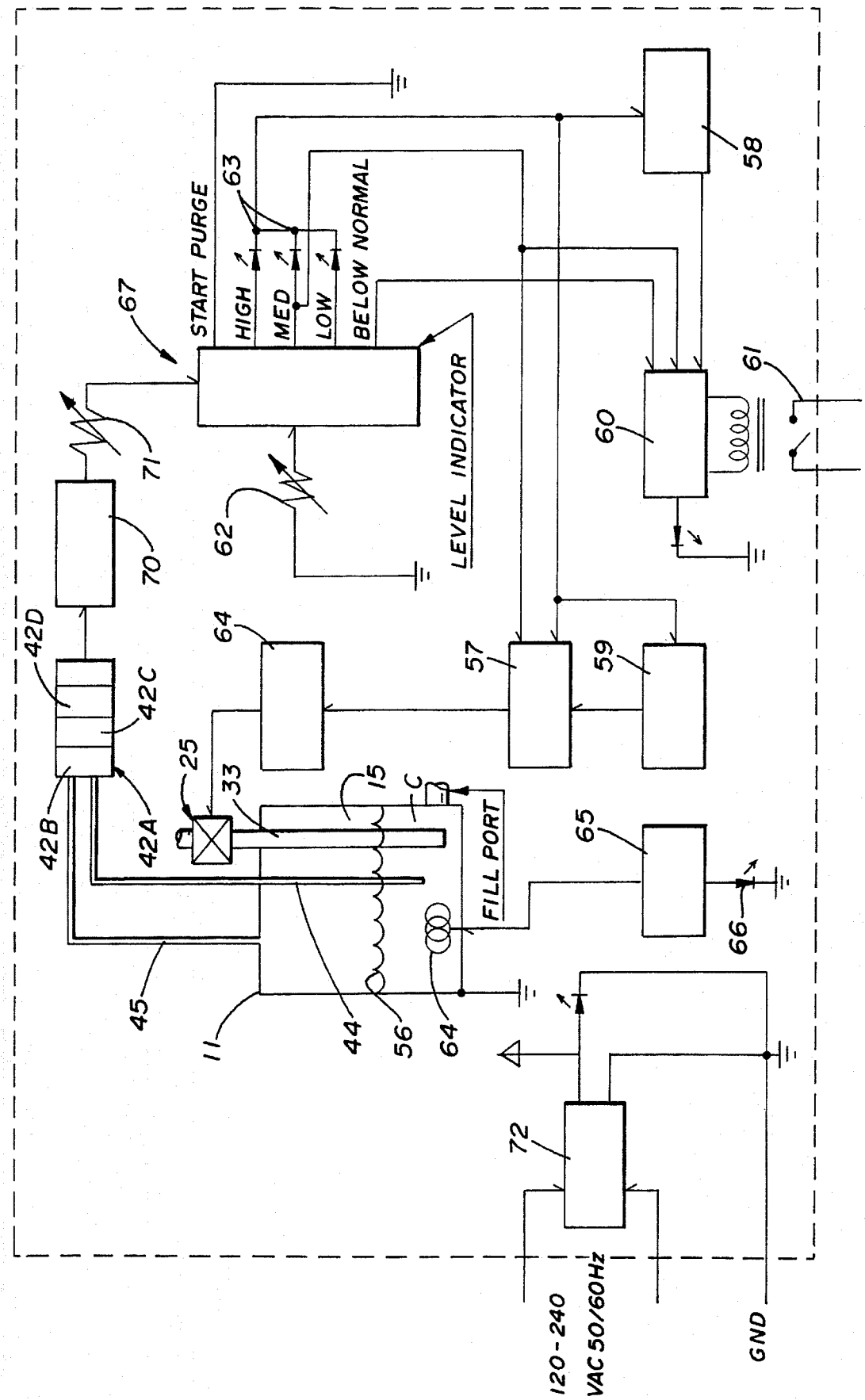
FIG. 5 is a functional block flow diagram of a control circuit associated with the condensate drain valve.

Referring to FIG. 5 of the drawings, a functional block diagram of the condensate trap and drain device of the invention is illustrated wherein the various components are shown in a control flow diagram path. The sensor tube 44 is positioned within the condensate reservoir 15 with a condensate level at 56 indicated. The control circuit components are illustrated by functional blocks including purge logic block 57, a purge timer 58, an overall system timer 59. An alarm logic circuit block 60 provides an alarm output at 61 which indicates abnormal, no function condition within the hereinbefore described system.

Figure 6:
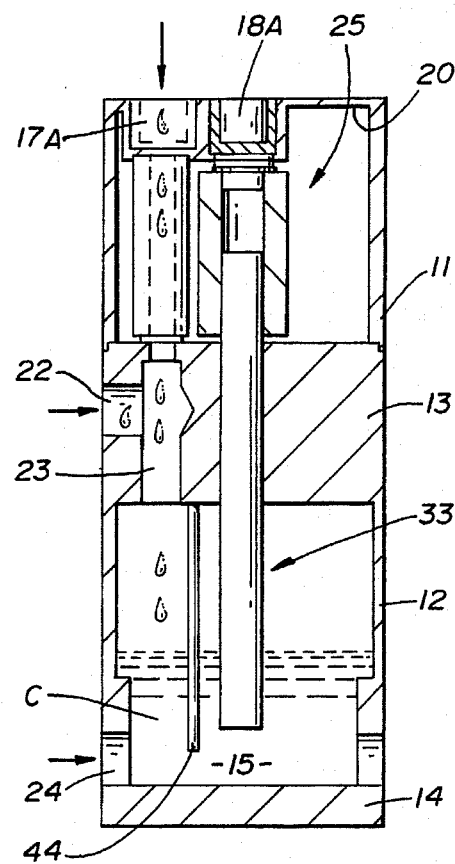
FIG. 6 is a graphic illustration of low condensate level within the valve system.
Figure 7:
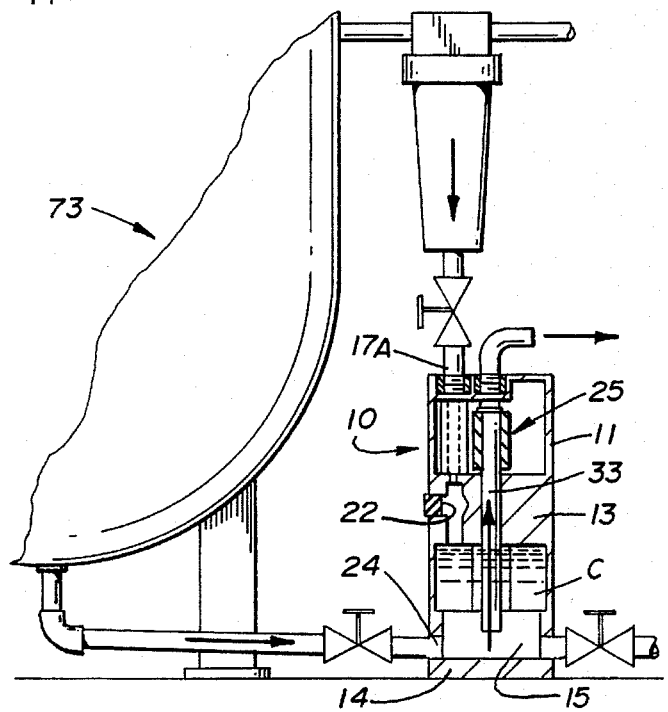
FIG. 7 is a graphic illustration of a high condensate level within the valve system installed on a fluid pressure system.

In operation, as the condensate level reaches the predetermined level in the condensate reservoir 15 as set by the trip point adjustment 62, the differential pressure changes within the condensate reservoir 15 inducing a low, medium and high condensate level as indicated on level indicator diodes 63 in the control circuit derived from output signals from the pressure sensor 42A. Once a high condensate level is reached a purge state is indicated and induced in the system. The solenoid valve assembly 25 is activated by a solenoid driver 64 energizing the solenoid coil 37 drawing the plunger 38 away from the valve seat 41 allowing condensate in the condensate reservoir 15 under the pressure of the system to exit through the purge outlet port 18A as illustrated in FIG. 7 of the drawings. As the purge of condensate continues and the condensate level drops within the condensate reservoir 15, a low level i.e. dropped in pressure differential is sensed by input from the sensor tubes 44 and 45 and registered by the differential pressure sensor 42A is thus indicated by the level indicator light emitting diodes 63 in the control circuit, the purge cycle ends as illustrated in FIG. 6 of the drawings and the solenoid valve 25 is closed. The condensate level status is thus monitored by the system with the alarm logic circuit block 60 and alarm output at 61 being activated within the control circuit to indicate lack of valve opening or unusual high or low levels of condensate within the condensate reservoir 15. The timer control circuits 58 and 59 are provided to oversee and extend purge valve cycles if necessary.

It will be evident from the above description that closed loop condensate removal is achieved that purges only on demand avoiding the loss of air pressure in a typical air pressurized system 73 on which it is installed as illustrated in FIG. 7.

Referring back to FIG. 5 of the drawings, the functional block diagram of the system of the invention, it will be seen that a optional heating coil 64 is provided within the condensate reservoir 15 having a heater control block 65 and a heat indicator at 66. The electrical output from the differential pressure sensor 42A is detected and treated by a sensing circuit 67 having an oscillator 68, level detection 70 and sensitivity adjustment 71 as will be well known and understood by those skilled in the art. A power source 72 for the control circuit is provided.

Thus it will be seen that a new and novel condensate trap and drain for systems under pressure has been illustrated and described and it will be apparent to those skilled in the art that various changes and modifications may be made therein without departing from the spirit of the invention, therefore I claim.

What I claim is:

1. A condensate trap and drain apparatus for systems under pressure, wherein said apparatus comprises:

a. a condensate collection reservoir, the collection reservoir being formed within a housing, the housing being connected to an inlet port;

b. a purge outlet port extending from said reservoir, a passageway connects the reservoir with the purge outlet port, the purge outlet port having a diaphragm normally closing the passageway, the diaphragm being controlled by a purge valve;

c. a first sensing probe projecting within said collection reservoir, the sensing probe detecting the pressure within said reservoir;

d. a second sensing probe detecting the pressure within said reservoir, the first sensing probe being in vertical spaced relation with the second sensing probe; and e. a solenoid being connected to the purge valve, the solenoid responding to a solenoid drive.

2. The apparatus in claim 1, wherein the housing further comprises an upper cylinder, a lower cylinder, top cap and bottom cap, the top cap is treadably connected between the upper cylinder and the lower cylinder, and the lower cap is threadably connected to the lower cylinder, the reservoir being formed amongst the lower cylinder, top cap and the lower cap.

3. The apparatus in claim 2, wherein the diaphragm valve has an aperture and a spring seat fitting, a spring attaches to the spring seat fitting urging the diaphragm to shut-off the passageway between the reservoir and the purge outlet.

4. The apparatus in claim 1, wherein the solenoid drive communicates with a controller, the controller responds to the pressure measurements from the first sensing probe and the second sensing probe.

\* \* \* \* \*